(12) United States Patent
Kim et al.

(10) Patent No.: US 9,490,481 B2
(45) Date of Patent: Nov. 8, 2016

(54) LAYERED LITHIUM NICKEL OXIDE, PROCESS FOR PRODUCING THE SAME AND LITHIUM SECONDARY CELL EMPLOYING IT

(71) Applicant: SK Innovation Co., Ltd., Seoul (KR)

(72) Inventors: Soo Ho Kim, Daejeon (KR); Hae Suk Hwang, Daejeon (KR); Min Gu Kang, Daejeon (KR); Jae Phil Cho, Ulsan (KR); Min Ki Jo, Ulsan (KR)

(73) Assignee: SK Innovation Co., Ltd., Seoul (KR)

( * ) Notice: Subject to any disclaimer, the term of this patent is extended or adjusted under 35 U.S.C. 154(b) by 0 days.

(21) Appl. No.: 14/248,933

(22) Filed: Apr. 9, 2014

(65) Prior Publication Data
US 2014/0306150 A1    Oct. 16, 2014

(30) Foreign Application Priority Data
Apr. 12, 2013  (KR) ........................ 10-2013-0040175

(51) Int. Cl.
| | |
|---|---|
| *H01M 4/525* | (2010.01) |
| *C01D 15/02* | (2006.01) |
| *C01G 51/00* | (2006.01) |
| *C01G 53/00* | (2006.01) |
| *H01M 10/052* | (2010.01) |

(52) U.S. Cl.
CPC .............. *H01M 4/525* (2013.01); *C01D 15/02* (2013.01); *C01G 51/006* (2013.01); *C01G 53/006* (2013.01); *H01M 10/052* (2013.01); *C01P 2002/72* (2013.01); *C01P 2002/76* (2013.01); *C01P 2002/85* (2013.01); *C01P 2002/88* (2013.01); *C01P 2004/61* (2013.01); *Y02E 60/122* (2013.01)

(58) Field of Classification Search
None
See application file for complete search history.

(56) References Cited

U.S. PATENT DOCUMENTS

| | | | | |
|---|---|---|---|---|
| 6,333,128 | B1* | 12/2001 | Sunagawa .............. | C01G 3/006 429/218.1 |
| 7,785,742 | B2* | 8/2010 | Suhara .................. | C01G 53/006 423/464 |
| 2008/0248391 | A1* | 10/2008 | Wakasugi .............. | B82Y 30/00 429/223 |
| 2009/0068561 | A1* | 3/2009 | Sun ....................... | H01M 4/131 429/223 |
| 2009/0121179 | A1* | 5/2009 | Shi ......................... | H01M 4/131 252/182.1 |
| 2012/0183855 | A1* | 7/2012 | Wohlfahrt-Mehrens ............... | H01M 4/485 429/221 |
| 2013/0022869 | A1* | 1/2013 | Yi ......................... | H01M 4/525 429/219 |

FOREIGN PATENT DOCUMENTS

| | | |
|---|---|---|
| JP | 2003183029 A | 7/2003 |
| JP | 2004241146 A | 8/2004 |
| JP | 2009215143 A | 9/2009 |
| JP | 2011129258 A | 6/2011 |
| KR | 1020100042145 A | 4/2010 |

OTHER PUBLICATIONS

English text machine translation of IDS reference JP 2009-215143 A, accessed on the AIPN JPO website on Dec. 17, 2015, pp. 1-16 are attached as a PDF.*

* cited by examiner

*Primary Examiner* — Harold Pyon
*Assistant Examiner* — Katie L Hammer
(74) *Attorney, Agent, or Firm* — The Webb Law Firm (57) ABSTRACT

Provided is a metal oxide for a cathode active material of a lithium secondary battery capable of having improved structural and thermal stability, high efficiency, high capacity, and excellent cycle property and life span property, the metal oxide represented by the following Chemical Formula 1:

$$Li_aNi_xCo_yM_zO_2 \quad \text{[Chemical Formula 1]}$$

(in Chemical Formula 1, M is any one selected from aluminum, magnesium, titanium, gallium and indium, and a, x, y and z satisfy $1.01 \leq a \leq 1.05$, $0.7 \leq x \leq 0.9$, $0 \leq y \leq 0.17$, $0.02 \leq z \leq 0.16$, and $x+y+z=1$, respectively).

12 Claims, 11 Drawing Sheets

LAYERED LITHIUM NICKEL OXIDE, PROCESS FOR PRODUCING THE SAME AND LITHIUM SECONDARY CELL EMPLOYING IT

CROSS-REFERENCE TO RELATED APPLICATION

This application claims priority to Korean Patent Application No. 10-2013-0040175 filed Apr. 12, 2013, the disclosure of which is hereby incorporated in its entirety by reference.

TECHNICAL FIELD

The present invention relates to a lithium metal oxide for a cathode active material of a lithium secondary battery.

BACKGROUND

As portability of electronic products becomes important, a lithium secondary battery has been widely used as a power of electronic devices having a small size, such as notebook PC, PDA, mobile phone, video camera, and the like, and due to properties of high capacity, high output, long-term life span, and the like, an application range thereof has been extended. However, the lithium secondary battery has a difficulty in being used for a long-term due to limitation of the existing electrode materials used in the lithium secondary battery. In order to overcome the above-described problem, various researches have been conducted, and in particular, development of a new cathode active material has been variously researched.

A representative material of the cathode active material of the lithium secondary battery is lithium cobalt oxide (LiCoO$_2$), and as substitutes thereof, lithium nickel oxide (LiNiO$_2$), lithium manganese oxide (LiMnO$_2$), or lithium nickel cobalt manganese oxide (LiNi$_{1-x-y}$Co$_x$Mn$_y$O$_2$), each having a layered structure, lithium manganese oxide (LiMn$_2$O$_4$) having a spinel structure, lithium iron phosphate oxide (LiFePO$_4$) having an olivine structure, and the like, have been actively researched.

Since a lithium cobalt oxide (LiCoO$_2$)-based active material has problems such as high raw material cost, and low thermal stability of cobalt, it is difficult to secure cost, capacity, or stability required in medium- and large-sized electric vehicle market such as hybrid electric vehicle (HEV) and electric vehicle (EV).

In order to substitute the lithium cobalt oxide active material, a manganese-based spinel or an olivine structure using iron have come to the front. However, a cathode active material having a spinel structure using manganese has significantly deteriorated capacity due to elution of manganese at high temperature and has a capacity relatively smaller than that of LiCoO$_2$. In addition, the olivine-based cathode active material has advantages such as raw material cost reduction and high thermal stability due to the use of iron; however, problems such as low driving voltage and low electric conductivity.

Patent document 1 (Korean Patent Laid-Open Publication No. KR 10-2010-0042145) discloses a cathode active material for a lithium secondary battery containing a lithium transition metal composite oxide, wherein the cathode active material contains manganese, and halogen element or sulfur to improve life span properties and charge and discharge properties of the lithium secondary battery; however, due to dispersion, structural and thermal stability are still deteriorated and electrochemical properties such as capacity deterioration, and the like, are poor.

Meanwhile, the cathode active material using nickel only is appropriate for a battery for high capacity and high voltage but has capacity deterioration occurred due to cation mixing and structural instability and weak thermal stability. As a nickel-based cathode active material, a composition having LiNi$_{1-x}$Co$_x$O$_2$ (x<0.2) is a representative example, and since cost of cobalt with respect to nickel is high, the cathode active material has a relatively high cost as compared to an LiNiO$_2$ material not containing cobalt, but is easy to be prepared. Nonetheless, LiNi$_{1-x}$Co$_x$O$_2$ (x<0.2) cathode material still has a problem during charge/discharge process, which is because a basic structural stability of the LiNiO$_2$ typed cathode material is deteriorated.

RELATED ART DOCUMENT (Patent Document 1) Korean Patent Laid-Open Publication No. KR 10-2010-0042145 (Apr. 23, 2010)

SUMMARY

An embodiment of the present invention is directed to providing a metal oxide for a cathode active material of a lithium secondary battery capable of having a regular crystalline structure to be easily synthesized and having a stabilized crystalline structure in a charged state to remarkably improve thermal and structural stability and express electrochemical properties such as high capacity and high efficiency, a method for preparing the same, and a lithium secondary battery containing the same.

In one general aspect, a metal oxide for a cathode active material of a lithium secondary battery is represented by the following Chemical Formula 1:

$$\text{Li}_a\text{Ni}_x\text{Co}_y\text{M}_z\text{O}_2 \qquad \text{[Chemical Formula 1]}$$

(in Chemical Formula 1, M is any one selected from aluminum, magnesium, titanium, gallium and indium, and a, x, y and z satisfy 1.01≤a≤1.05, 0.7≤x≤0.9, 0≤y≤0.17, 0.02≤z≤0.16, and x+y+z=1, respectively).

In the metal oxide for a cathode active material of a lithium secondary battery represented by Chemical Formula 1 above, nickel and cobalt may be selected as a transition metal, and any one metal selected from aluminum, magnesium, titanium, gallium and indium may be selected as a Group 3A metal, and due to addition of the metals, the metal functions as an axis in a structure, thereby not causing a structural change even though an excessive content of lithium is desorbed at the time of charge and discharge. Therefore, due to doping of the transition metal and the Group 3A metal, electrochemical properties such as high capacity and high efficiency may be expressed and structural stability may be maximized, thereby increasing cycle property and life span property. It is more preferred that aluminum is selected as the Group 3A metal. Aluminum shows electrochemical inert state in a structure and may maximize structural stability by strong bond between aluminum and oxygen, thereby improving electrochemical properties such as high capacity and high efficiency, cycle property, and life span property at the time of charge and discharge.

In the metal oxide for a cathode active material of a lithium secondary battery according to an embodiment of the present invention, structural stability may be improved by doping Li—Co—Ni-based composite precursor oxide with Group 3A metal, wherein a molar ratio of the content thereof is 0.02 to 0.16 mol %, preferably 0.02 to 0.13 mol %, and more preferably, 0.02 to 0.09 mol % to provide high capacity and high efficiency depending on charge and discharge.

In the metal oxide for a cathode active material of a lithium secondary battery according to an embodiment of the present invention, concentration gradient of M being Group 3A metal may be decreased from a surface of a particle toward a center thereof. Concentration of M in the metal oxide may be high on the surface thereof to increase reactivity on the surface and to decrease volume expansion, thereby maintaining structural stability and preventing capacity and life span at high efficiency from being deteriorated. In addition, thermal stability may be increased due to binding force of Al—O stronger than that of Ni—O.

A crystalline structure of the metal oxide for a cathode active material of a lithium secondary battery according to an embodiment of the present invention is a rhombohedral structure, thereby expressing excellent charge and discharge cycle stability. That is, the cathode active material may have an R-3m rhombohedral structure by limiting molar ratio of lithium, nickel, cobalt and Group 3A element in chemical structural formula represented by Chemical Formula 1 above.

In Chemical Formula 1, a showing a content of lithium is preferred to be 1, and in a case where a is less than 1, the desired capacity of the material may be decreased and formation of $Ni^{2+}$ in the lithium layer may be increased. Further, in a case where a is 1.1 or more, impurities may occur due to residual lithium salt.

Nickel has a content of 0.7 to 0.9 to implement high capacity, and in a case where a content of nickel is more than 0.9, structural stability and thermal stability may be deteriorated. In addition, cobalt is an element that is helpful in forming R-3m rhombohedral structure, wherein the cobalt has a content less than 0.17, which is economical in view of a preparation cost.

In the present invention, the content of Group 3A element is 0.02 to 0.16 showing electrochemically inert state in a structure, wherein in a case where the content thereof is more than the range, the material capacity is decreased, such that properties may be deteriorated, and therefore, the content of Group 3A element is preferably 0.02 to 0.13, more preferably, 0.02 to 0.09.

In another general aspect, a method for preparing a metal oxide for a cathode active material of a lithium secondary battery includes: preparing an aqueous solution by dissolving acetate containing at least any one metal selected from aluminum, magnesium, titanium, indium, and gallium in an organic solvent; preparing a metal oxide precursor mixed solution by adding a metal salt containing nickel and cobalt to the aqueous solution; obtaining a solid dried material by removing a solvent of the mixed solution; and mixing and pulverizing the solid dried material and lithium precursor and performing a heat treatment.

In the method for preparing a metal oxide for a cathode active material of a lithium secondary battery according to an embodiment of the present invention, the reason of using the acetate of Group 3A metal at the time of preparing an aqueous solution is that mixing with the organic solvent enables to be easy to increase dispersibility and an organic solvent having low boiling point enables to be selected to easily remove the solvent, and eventually, due to the dispersibility and easiness to remove the solvent, structural stability of the cathode active material may be increased, and thus, electric properties may be improved. Here, the organic solvent is not limited, but ethanol is preferably used as the organic solvent.

The acetate of Group 3A metal is not limited, but may be any one or two or more mixtures selected from aluminum acetate, indium acetate hydrate, and gallium acetate.

The solvent of the mixed solution may be removed by any one process of a drying process and a solvent extracting process.

Here, the drying process may be performed at room temperature to 200° C. under a condition of vacuum or a normal pressure.

The solid dried material may have a particle size of 3 to 10 μm. When the solid dried material has a particle size out of the range, it is not preferred since density of a pole plate is decreased or a specific surface area is decreased.

In the method for preparing a metal oxide for a cathode active material of a lithium secondary battery according to an embodiment of the present invention, it is preferred to perform the heat treatment process at 400 to 500° C. for 3 to 7 hours and at 700 to 900° C. for 10 to 24 hours, thereby increasing a mixing reaction rate of a raw material containing a metal precursor and developing a crystalline structure of a layered structure.

Here, it is preferred to perform the heat treatment process under an oxygen atmosphere, thereby suppressing $Ni^{2+}$ ion from being generated.

In addition, it is preferred to add an excessive content of lithium in a content of 1.01 to 1.05 mole with respect to the metal as compensation for lithium lost in the heat treatment process.

The metal oxide finally obtained by the method may include a composition represented by the following Chemical Formula 1:

$Li_aNi_xCo_yM_zO_2$ <span style="float:right">[Chemical Formula 1]</span>

(in Chemical Formula 1, M is any one selected from aluminum, magnesium, titanium, gallium and indium, and a, x, y and z satisfy 1.01≤a≤1.05, 0.7≤x≤0.9, 0≤y≤0.17, 0.02≤z≤0.16, and x+y+z=1, respectively).

In another general aspect, a lithium secondary battery contains the metal oxide for a cathode active material of a lithium secondary battery as described above.

DETAILED DESCRIPTION OF EMBODIMENTS

Hereinafter, the present invention will be more appreciated by the following examples, which are given by way of illustration but are not intended to limit the protective scope defined by the attached claims of the present invention.

Example 1

2 g of $Ni_{0.89}Cu_{0.11}(OH)_2$ as a precursor compound as added to a mixed solution prepared by dissolving 0.4 g of aluminum acetate into 30 ml of ethanol and mixed with together at 200 rpm for 1 hour, then the solvent was evaporated using a hot plate to obtain a powder, and the powder was vacuum-dried at 100° C.

The obtained powder and $LiOH.H_2O$ satisfying a molar ratio of Li/(Ni+Co+Al)=1.03 were pulverized in a mortar and mixed with together. A heat treatment process was continuously performed on the mixture at 450° C. for 5 hours and at 750° C. for 18 hours under an oxygen atmosphere.

Example 2

Example 2 was performed as the same as Example 1 above except that 0.6 g of aluminum acetate was dissolved into 30 ml of ethanol.

Comparative Example 1

$Ni_{0.89}Co_{0.11}(OH)_2$ as a precursor compound and $LiOH.H_2O$ satisfying a molar ratio of Li/(Ni+Co+Al)=1.03 were pulverized in a mortar and mixed with together. A heat treatment process was continuously performed on the mixture at 450° C. for 5 hours and at 750° C. for 18 hours under an oxygen atmosphere.

Figure 1:
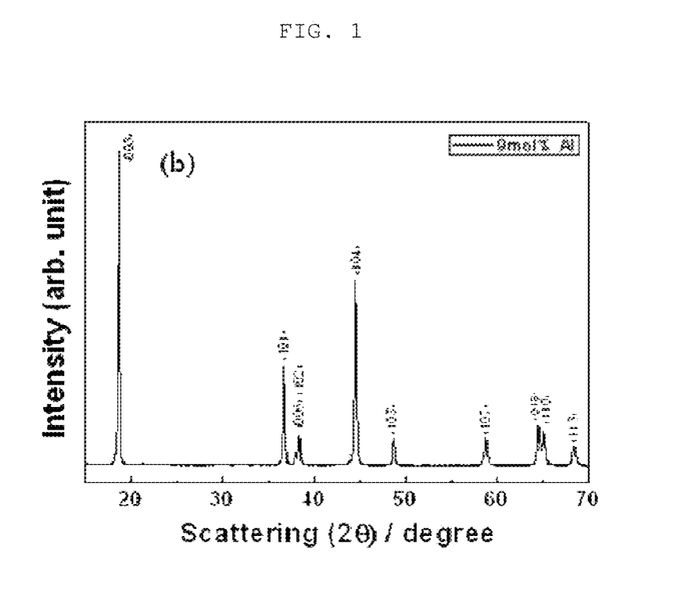
FIG. 1 shows XRD of a cathode active material ($Li_{1.03}Ni_{0.81}Cu_{0.1}Al_{0.09}O_2$) according to Example 1 of the present invention.
Figure 2:
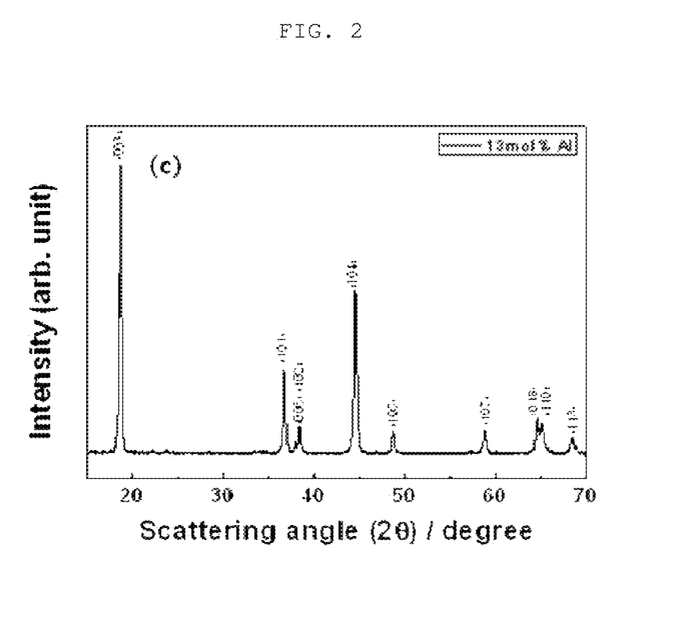
FIG. 2 shows XRD of a cathode active material ($Li_{1.03}Ni_{0.77}Cu_{0.1}Al_{0.13}O_2$) according to Example 2 of the present invention.
Figure 3:
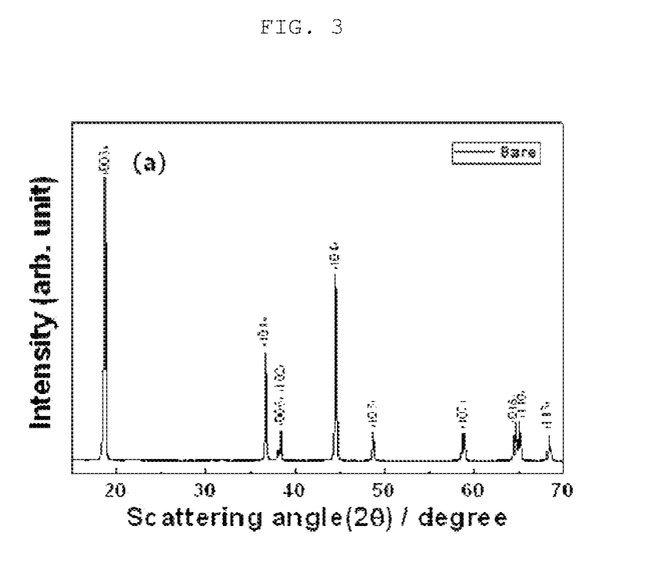
FIG. 3 shows XRD of a cathode active material ($Li_{1.03}Ni_{0.89}Cu_{0.11}O_2$) according to Comparative Example in which an aluminum doping is not performed.
Figure 4:
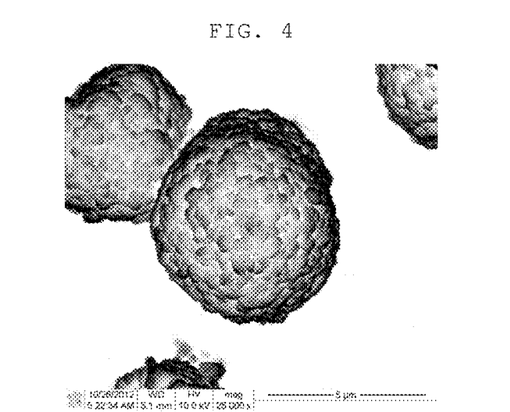
FIGS. 4 to 6 show SEM of each cathode active material of Example 1 and 2, and Comparative Example.
Figure 5:
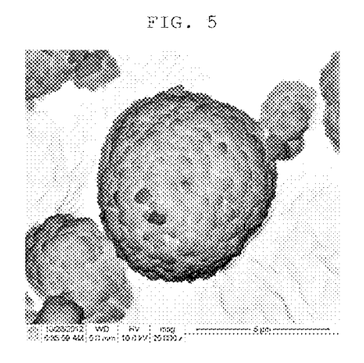
Figure 6:
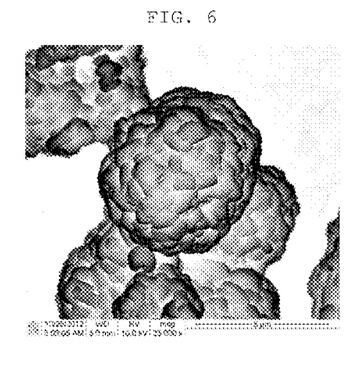
Figure 7:
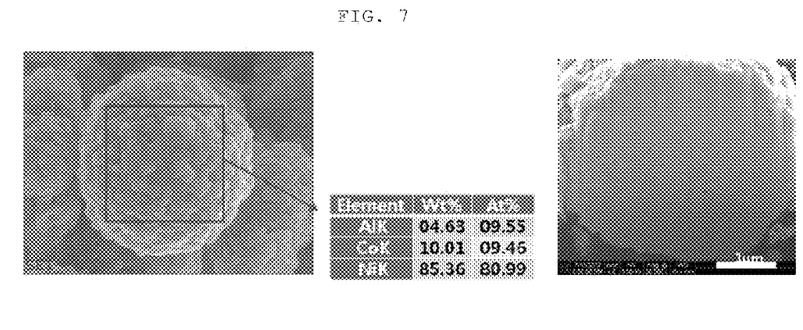
FIGS. 7 to 10 show results obtained by measuring EDAX of the cathode active material according to Example 1 of the present invention.
Figure 8:
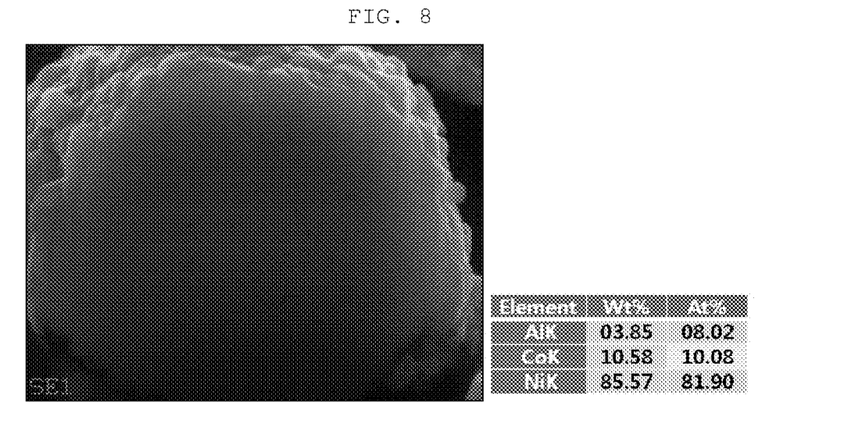
Figure 9:
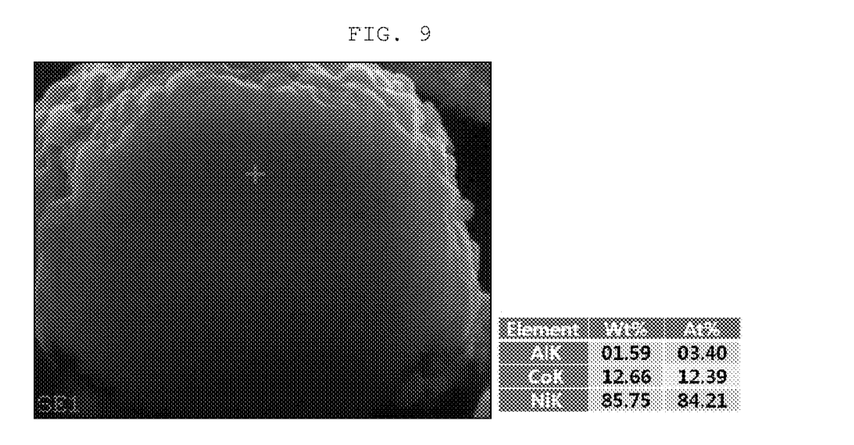
Figure 10:
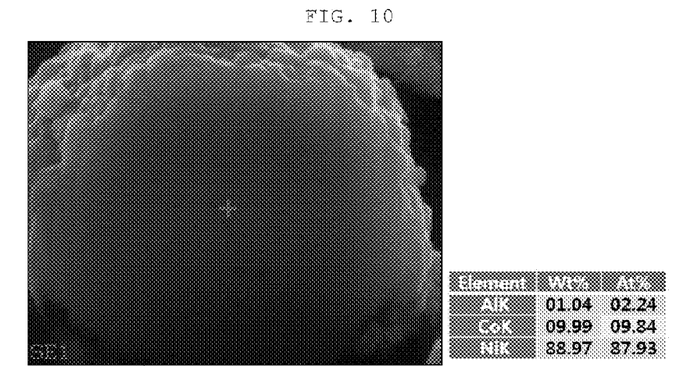
Figure 11:
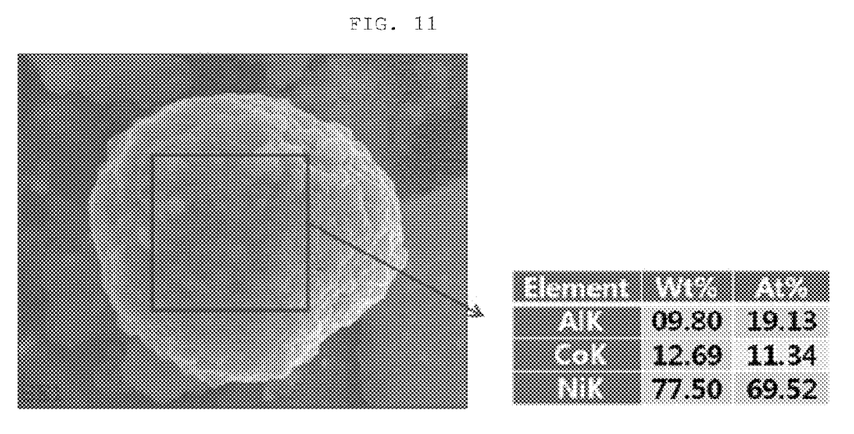
FIGS. 11 to 14 show results obtained by measuring EDAX of the cathode active material according to Example 2 of the present invention.
Figure 12:
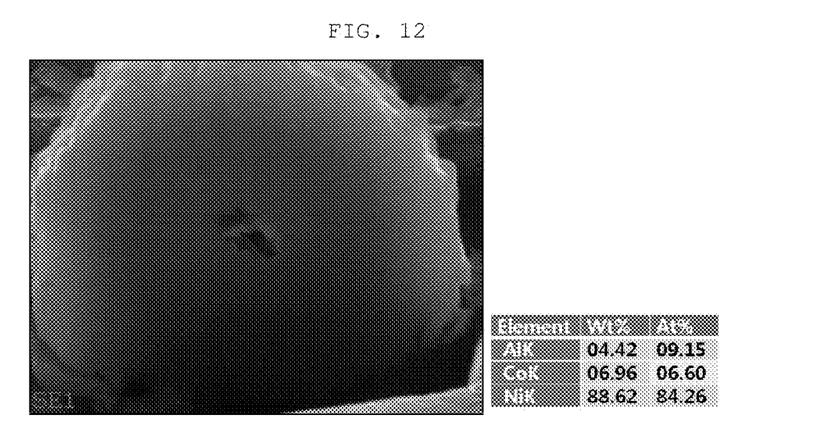
Figure 13:
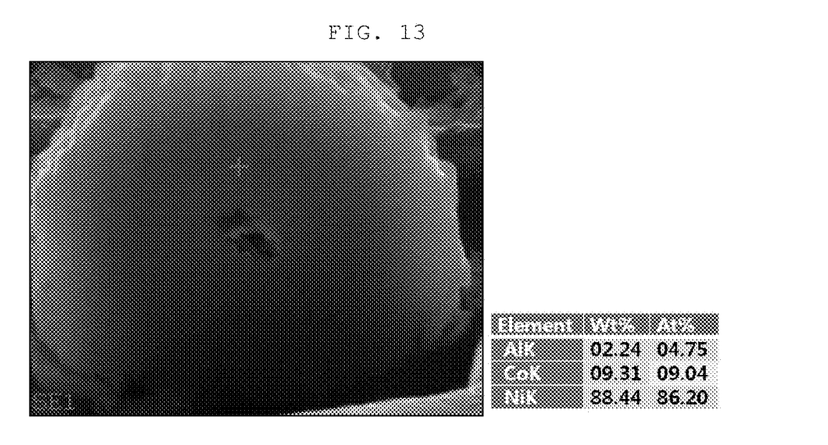
Figure 14:
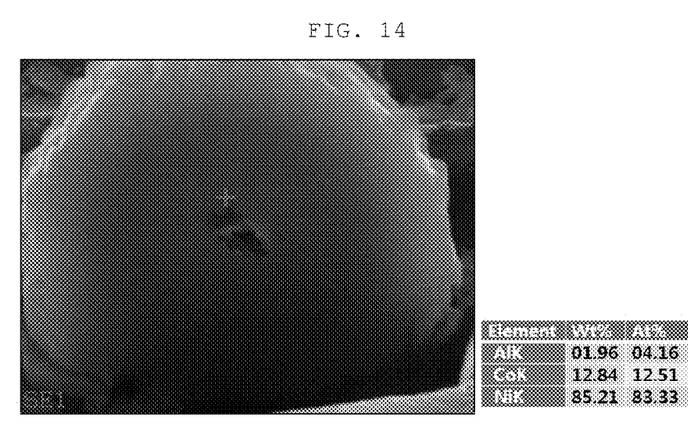

FIGS. 1 to 3 show XRD patterns of the cathode active materials according to Examples 1 and 2 and Comparative Example of the present invention, respectively, and as shown in FIGS. 4 to 6, each SEM photographs may be confirmed.

FIGS. 7 to 10 and FIGS. 11 to 14 show EDAX of the cathode active materials according to Examples 1 and 2, respectively, and it may be confirmed from EDAX measurement through FIB cross section that a content of aluminum is decreased from a surface of a particle toward a center thereof, which shows that aluminum achieves concentration gradient in a particle.

Figure 15:
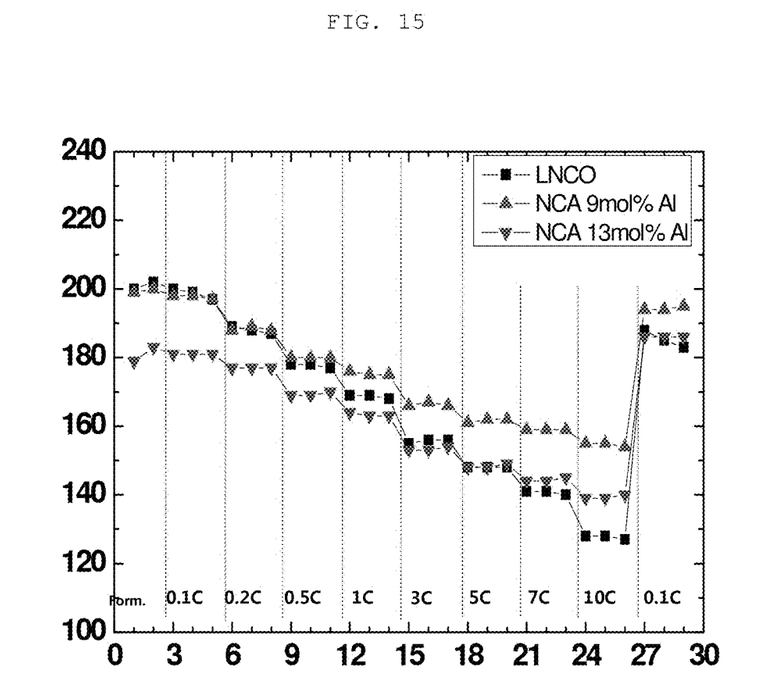
FIG. 15 shows charge and discharge capacity property depending on a change of discharge rate with respect to a predetermined charge rate of Examples according to the present invention and Comparative Example.
Figure 16:
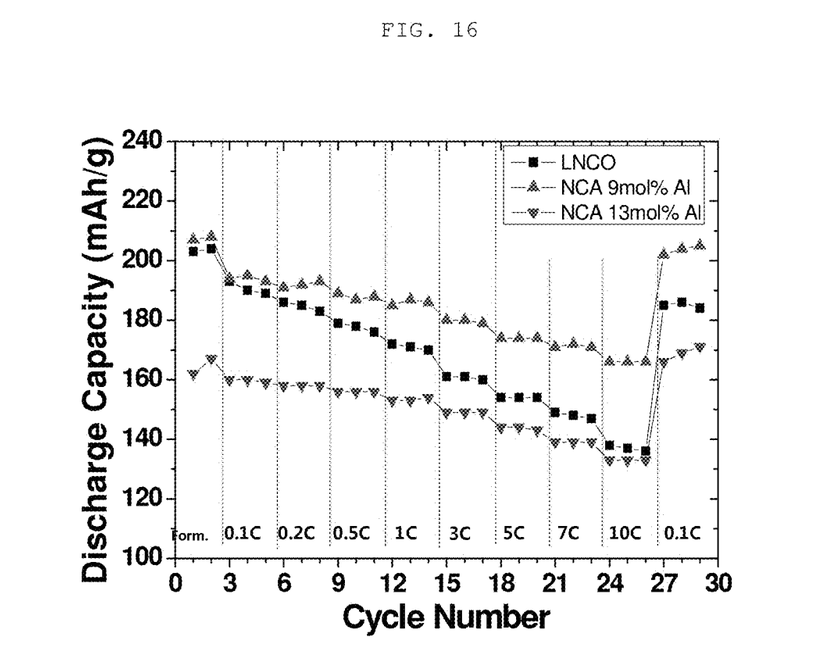
FIG. 16 shows charge and discharge capacity property depending on a change of charge rate with respect to a predetermined discharge rate of Examples according to the present invention and Comparative Example.

FIGS. 15 and 16 show charge and discharge properties depending on capacity of Examples 1 and 2 according to the present invention and Comparative Example 1, and more specifically, when confirming FIG. 15 showing capacity measured at a constant charge rate but various discharge rates and FIG. 16 showing capacity measured at a constant discharge rate but various charge rates, the cathode active material of Example 1 according to the present invention showed excellent electrochemical properties as compared to that of Comparative Example 1.

Figure 17:
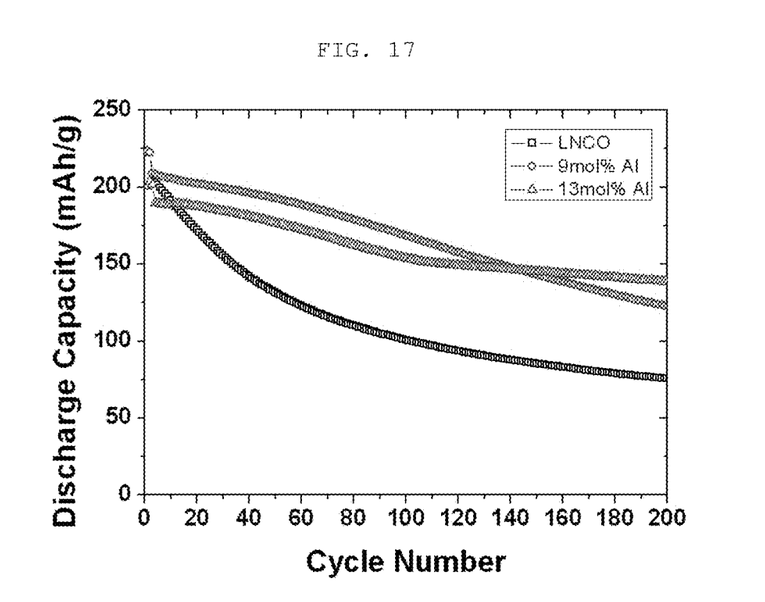
FIG. 17 shows life span properties at 60 of Examples according to the present invention and Comparative Example.
Figure 18:
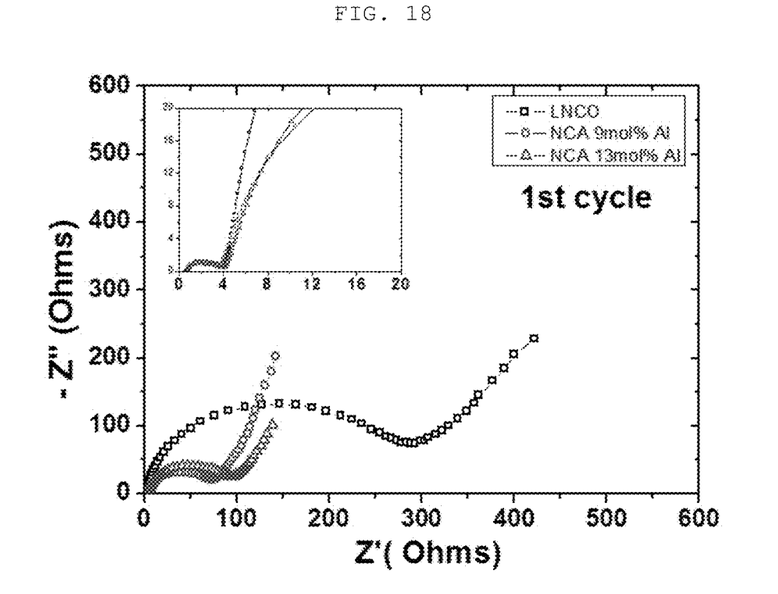
FIGS. 18 to 21 shows impedance measured depending on life span of Examples according to the present invention and Comparative Example.
Figure 19:
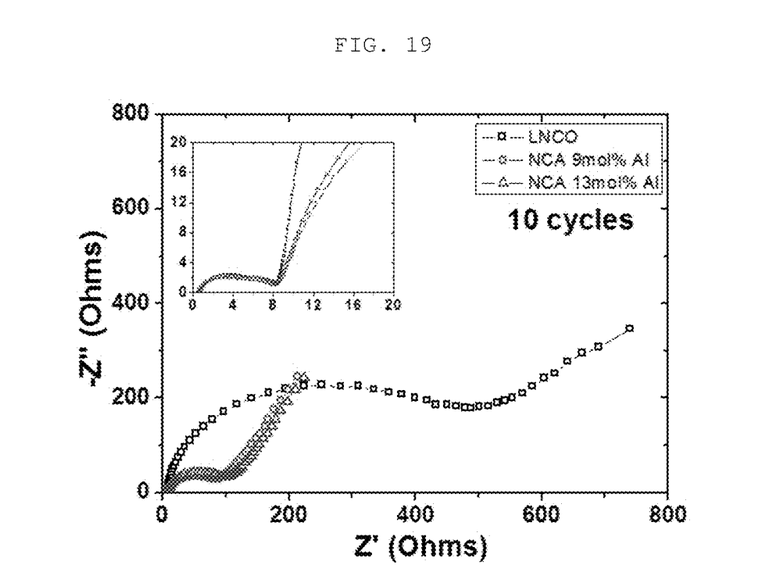
Figure 20:
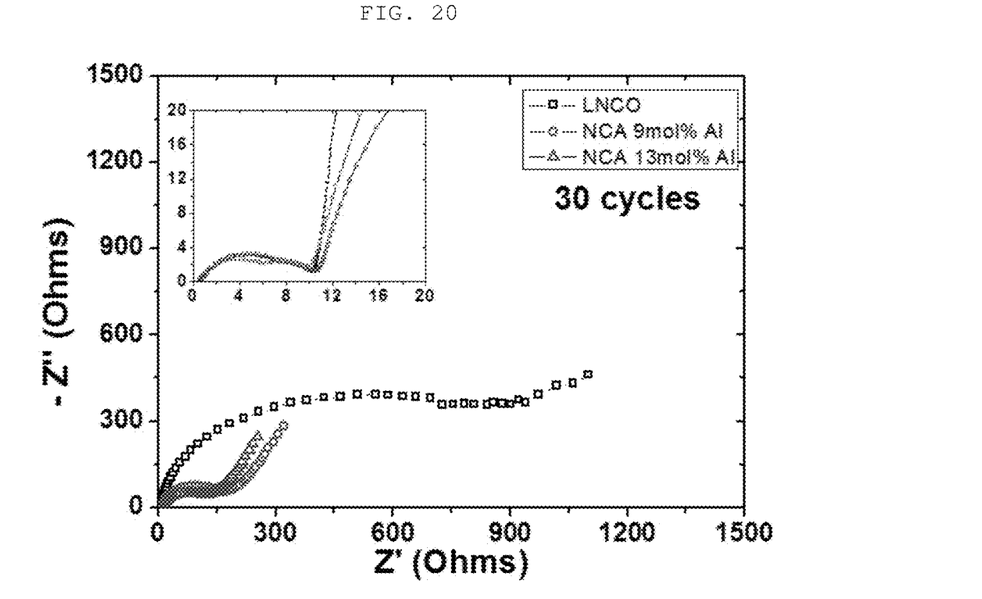
Figure 21:
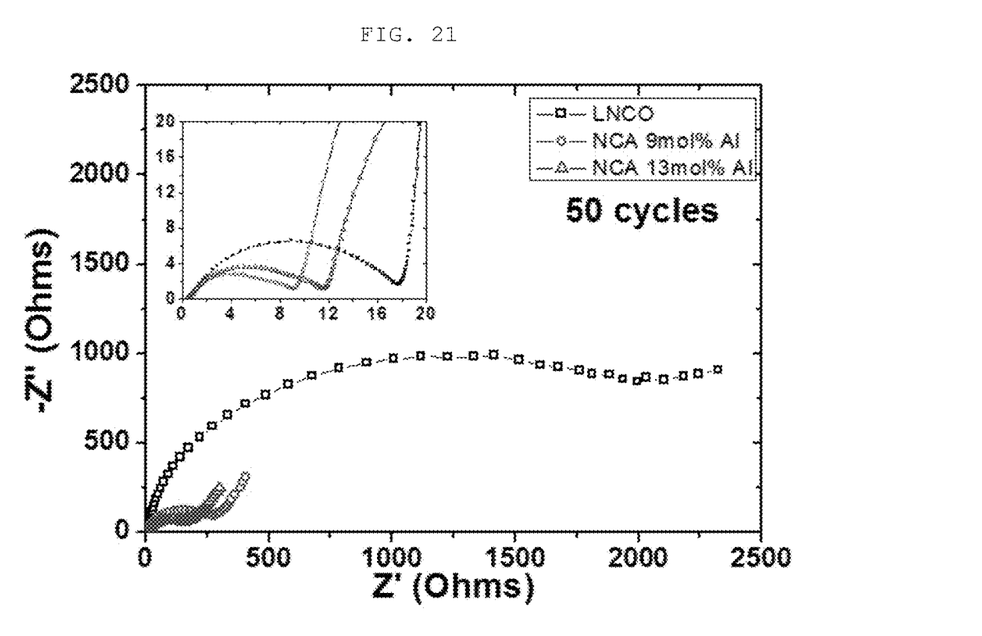

In addition, FIG. 17 shows cycle property of Examples according to the present invention and Comparative Example and it was confirmed that in Example 1 (doped with 9 mol % aluminum) and Example 2 (doped with 13 mol % aluminum), rapid decrease in capacity was not shown at high temperature, but in Comparative Example 1, rapid decrease in capacity occurred and in Example 2, significantly excellent capacity property after 140 cycles was expressed. The above-described results are caused by lack of contribution in capacity since aluminum present in a structure is in an inert state during a charge and discharge process. In particular, in Example 2 (doped with 13 mol % aluminum), high efficiency property was lower that that of Comparative Example; however, in view of life span at high temperature, Example 2 was more excellent than Comparative Example 1 and Example 1, which is because the content of aluminum is relatively large in a structure.

FIGS. 18 to 21 show impedance measured depending on life span of Examples 1 and 2 according to the present invention and Comparative Example, wherein according to life span, charge transfer resistance was increased; however, in Comparative Example, the increase in charge transfer resistance was relatively large as compared to Examples 1 and 2, which indicated that as cycle progressed, resistance factor disturbing lithium to be delivered was increased. The increase in resistance is involved with structural stability during a progress of repeated charge and discharge of the battery, wherein in Comparative Example having relatively low structural stability, a degree at which the structure is destroyed during repeated charge and discharge process was increased as compared to Examples 1 and 2, which is because it is difficult to move lithium ions into the structure of the active material and the difficulty is reflected as a resistance of the battery. Meanwhile, in Examples 1 and 2 that aluminum is contained in a structure, aluminum is present in the structure, such that as cycle progresses, structural stability may be improved and movement of lithium may be smooth, which is confirmed that the increase in resistance is remarkably decreased as compared to Comparative Example.

When comparing Example 1 (doped with 9 mol % aluminum) and Example 2 (doped with 13 mol % aluminum), significant difference in resistance as life span progresses was not shown as compared to difference in aluminum content.

Figure 22:
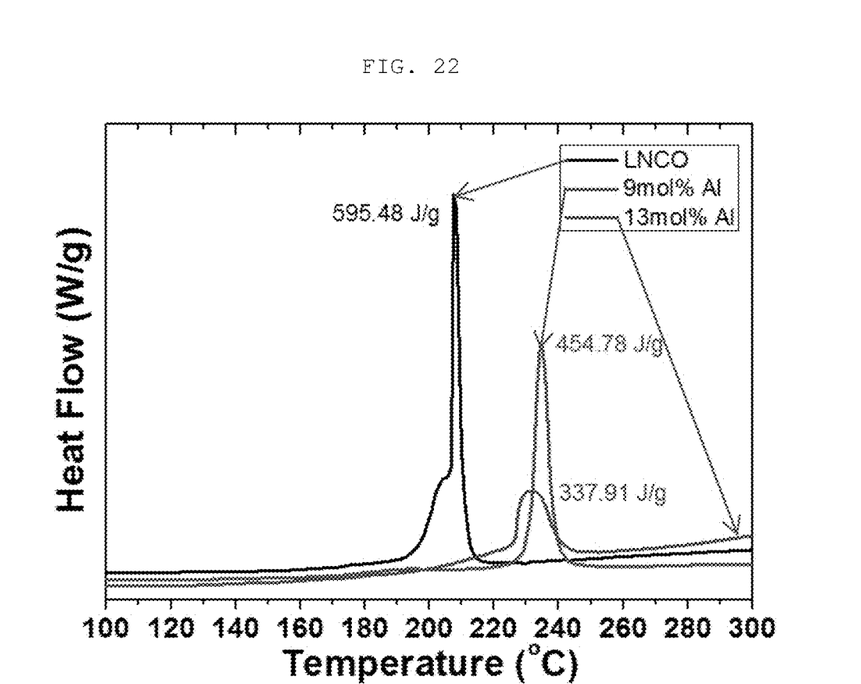
FIG. 22 shows results obtained by measuring differential scanning calorimetry (DSC) of Examples according to the present invention and Comparative Example.

FIG. 22 shows results obtained by measuring differential scanning calorimetry (DSC) of Examples according to the present invention and Comparative Example after charging 4.5 V, wherein it was confirmed that in Examples 1 and 2, an onset point temperature at which heat generation starts and a peak point temperature were increased as compared to Comparative Example, and heat generation amount in Examples 1 and 2 was lower than that of Comparative Example. In addition, Example 2 showed the lowest heat generation amount, which is because aluminum is the most largely distributed in a structure of the active material, and thus, thermal stability due to improvement in structural stability is increased. In addition, the results are related with a binding force between metal and oxygen in a structure, which is because binding and de-binding energy (512 kJ/mol) of Al—O is higher than binding and de-binding energy (391.6 kJ/mol) of Ni—O. Accordingly, it could be confirmed that in Examples containing aluminum, thermal stability was improved as compared to Comparative Example.

The metal oxide for a cathode active material of a lithium secondary battery according to the present invention has a rhombohedral crystalline structure, such that structural and thermal stability may be increased and electrochemical properties such as high capacity and high efficiency may be expressed, at the time of charge and discharge.

What is claimed is:

1. A metal oxide for a cathode active material of a lithium secondary battery, the metal oxide represented by the following Chemical Formula 1:

$$Li_aNi_xCo_yM_zO_2 \quad \text{[Chemical Formula 1]}$$

wherein, in Chemical Formula 1, M is any one selected from aluminum, magnesium, titanium, gallium and indium, and a, x, y and z satisfy $1.01 \leq a \leq 1.05$, $0.7 \leq x \leq 0.9$, $0 \leq y \leq 0.17$, $0.02 \leq z \leq 0.16$, and $x+y+z=1$, respectively, and wherein a concentration of M has a gradient at which the concentration is decreased from a surface of the metal oxide to a center thereof.

2. The metal oxide for a cathode active material of a lithium secondary battery of claim 1, wherein z of Chemical Formula 1 satisfies $0.02 \leq z \leq 0.09$.

3. The metal oxide for a cathode active material of a lithium secondary battery of claim 1, wherein the cathode active material has a rhombohedral structure.

4. A method for preparing a metal oxide for a cathode active material of a lithium secondary battery, the method comprising:
   preparing an aqueous solution by dissolving acetate containing at least any one metal selected from aluminum, magnesium, titanium, indium, and gallium in an organic solvent;
   preparing a metal oxide precursor mixed solution by adding a metal salt containing nickel and cobalt to the aqueous solution;
   obtaining a solid dried material by removing a solvent of the mixed solution; and
   mixing and pulverizing the solid dried material and lithium precursor and performing a heat treatment, wherein the metal oxide obtained by the method is represented by the following Chemical Formula 1:

$$Li_aNi_xCo_yM_zO_2 \quad \text{[Chemical Formula 1]}$$

wherein, in Chemical Formula 1, M is any one selected from aluminum, magnesium, titanium, gallium and indium, and a, x, y, and z satisfy $1.01 \leq a \leq 1.05$, $0.7 \leq x \leq 0.9$, $0 \leq y \leq 0.17$, $0.02 \leq z \leq 0.16$, and $x+y+z=1$, respectively, and wherein a concentration of M has a gradient at which the concentration is decreased from a surface of the metal oxide to a center thereof.

5. The method of claim 4, wherein the acetate containing at least any one metal selected from aluminum, magnesium, titanium, indium, and gallium is any one or two or more mixtures selected from aluminum acetate, indium acetate hydrate, and gallium acetate.

6. The method of claim 4, wherein the metal oxide finally obtained by the method includes a composition represented by the following Chemical Formula 1:

$$Li_aNixCo_yM_zO_2 \quad \text{[Chemical Formula 1]}$$

(in Chemical Formula 1, M is any one selected from aluminum, magnesium, titanium, gallium and indium, and a, x, y and z satisfy $1.01 \leq a \leq 1.05$, $0.7 \leq x \leq 0.9$, $0 \leq y \leq 0.17$, $0.02 \leq z \leq 0.16$, and $x+y+z=1$, respectively).

7. The method of claim 4, wherein the solvent of the mixed solution is removed by any one process of a drying process and a solvent extracting process.

8. The method of claim 7, wherein the drying process is performed at room temperature to 200° C. under a condition of vacuum or a normal pressure.

9. The method of claim 7, wherein the solid dried material has a particle size of 3 to 10 μm.

10. A lithium secondary battery comprising the metal oxide for a cathode active material of a lithium secondary battery of claim 1.

11. A lithium secondary battery comprising the oxide for a cathode active material of a lithium secondary battery of claim 2.

12. A lithium secondary battery comprising the oxide for a cathode active material of a lithium secondary battery of claim 3.

* * * * *

UNITED STATES PATENT AND TRADEMARK OFFICE
CERTIFICATE OF CORRECTION

PATENT NO. : 9,490,481 B2
APPLICATION NO. : 14/248933
DATED : November 8, 2016
INVENTOR(S) : Soo Ho Kim et al.

It is certified that error appears in the above-identified patent and that said Letters Patent is hereby corrected as shown below:

In the Specification

Column 4, Line 46, delete "($Li_{1.03}Ni_{0.81}Cu_{0.1}Al_{0.09}O_2$)" and insert -- ($Li_{1.03}Ni_{0.81}Co_{0.1}Al_{0.09}O_2$) --

Column 4, Line 49, delete "($Li_{1.03}Ni_{0.77}Cu_{0.1}Al_{0.13}O_2$)" and insert -- ($Li_{1.03}Ni_{0.77}Co_{0.1}Al_{0.13}O_2$) --

Column 4, Line 52, delete "($Li_{1.03}Ni_{0.89}Cu_{0.11}O_2$)" and insert -- ($Li_{1.03}Ni_{0.89}Co_{0.11}O_2$) --

Signed and Sealed this
Twenty-fifth Day of October, 2022

Katherine Kelly Vidal
*Director of the United States Patent and Trademark Office*